US007727057B2

(12) United States Patent
Beier et al.

(10) Patent No.: US 7,727,057 B2
(45) Date of Patent: Jun. 1, 2010

(54) DEVICE AND PROCESS FOR HEATING AN AIRCRAFT CABIN

(75) Inventors: Jens Beier, Drestedt (DE); Frank Klimpel, Naherfurth in Kayhude (DE)

(73) Assignee: Airbus Deutschland GmbH, Hamburg (DE)

( * ) Notice: Subject to any disclaimer, the term of this patent is extended or adjusted under 35 U.S.C. 154(b) by 537 days.

(21) Appl. No.: 10/582,594

(22) PCT Filed: Dec. 30, 2004

(86) PCT No.: PCT/EP2004/014855

§ 371 (c)(1),
(2), (4) Date: Jun. 9, 2006

(87) PCT Pub. No.: WO2005/063576

PCT Pub. Date: Jul. 14, 2005

(65) Prior Publication Data

US 2007/0144729 A1    Jun. 28, 2007

(30) Foreign Application Priority Data

Dec. 30, 2003    (DE) ............................... 103 61 658

(51) Int. Cl.
*B64D 13/08* (2006.01)
*B64D 13/02* (2006.01)
*B64D 13/00* (2006.01)

(52) U.S. Cl. ............................. 454/76; 454/71; 454/72; 454/74; 244/118.5; 165/235

(58) Field of Classification Search ............. 454/71, 454/72, 76, 74; 62/172; 244/118.5; 165/235

See application file for complete search history.

(56) References Cited

U.S. PATENT DOCUMENTS 2,391,838 A * 12/1945 Kleinhans et al. ............ 165/235

(Continued)

FOREIGN PATENT DOCUMENTS

DE          3638802          5/1988

(Continued)

OTHER PUBLICATIONS

English Translation of Decision on Granting a Patent for Invention, Russian Patent Office, Dec. 19, 2008.

(Continued)

*Primary Examiner*—Steven B McAllister
*Assistant Examiner*—Patrick F. O'Reilly, III
(74) *Attorney, Agent, or Firm*—Wood, Herron & Evans, L.L.P.

(57) ABSTRACT

The invention relates to a device (10) for heating an aircraft cabin and comprises a first hot air supply line (12) that leads to an air conditioning unit (14), a flow control valve (16) that is disposed in the first hot air supply line (12) upstream from the air conditioning unit (14), and a second hot air supply line (18) that branches off from the first hot air supply line (12) between the flow control valve (16) and the air conditioning unit (14) and bypasses the air conditioning unit (14). In order to assure air conditioning of the aircraft cabin in the event of a failure of the air conditioning unit (14) a third hot air supply line (20) branches off from the first hot air supply line (12) upstream from the flow control valve (16), which third hot air supply line (20) connects the first hot air supply line (12) to the second hot air supply line (18). Further a first close off mechanism is disposed in the second hot air supply line (18) upstream from the junction with the third hot air supply line (20), which first close off mechanism in its closed position prevents a flow from the second hot air supply line (18) back into the first hot air supply line (12). Finally a second close off mechanism is disposed in the third hot air supply line (20) upstream from the junction with the second hot air supply line (18).

9 Claims, 2 Drawing Sheets

U.S. PATENT DOCUMENTS

| | | | |
|---|---|---|---|
| 2,562,918 A * | 8/1951 | Hynes | 454/74 |
| 2,851,254 A | 9/1958 | Messinger et al. | |
| 3,177,679 A * | 4/1965 | Quick et al. | 62/402 |
| 3,825,212 A * | 7/1974 | Darges et al. | 244/118.5 |
| 4,149,389 A * | 4/1979 | Hayes et al. | 62/79 |
| RE32,100 E * | 4/1986 | Rannenberg | 62/80 |
| 5,299,763 A * | 4/1994 | Bescoby et al. | 244/118.5 |
| 5,906,111 A * | 5/1999 | Lui | 62/402 |
| 5,934,083 A * | 8/1999 | Scherer et al. | 62/79 |
| 6,012,515 A | 1/2000 | Stubbendorff et al. | |
| 6,189,324 B1 | 2/2001 | Williams et al. | |
| 6,199,387 B1 | 3/2001 | Sauterleute | |
| 6,250,097 B1 * | 6/2001 | Lui et al. | 62/402 |
| 2003/0141413 A1 | 7/2003 | Brasseur et al. | |

FOREIGN PATENT DOCUMENTS

| | | |
|---|---|---|
| GB | 954342 | 4/1964 |
| GB | 2398864 A * | 9/2004 |
| RU | 2111152 | 5/1998 |

OTHER PUBLICATIONS

Lufthansa Report 0479, German.

Forms PCT/ISA/210, 220, 237 International Search Report for PCT/EP2004/014855, mailed on May 2, 2005.

* cited by examiner

DEVICE AND PROCESS FOR HEATING AN AIRCRAFT CABIN

TECHNICAL FIELD

The present invention relates to a device and a process for heating an aircraft cabin.

BACKGROUND OF THE INVENTION

For controlling the climate of aircraft cabins hot air is normally taken from the engines of an aircraft. This hot air, which is called bleed air, passes through an air line including a flow control valve for controlling the flow volume to an air conditioning unit wherein the hot air is cooled to the temperature required in the aircraft cabin. In aircrafts in the cabins of which different climate zones are to be set it is also known to cool down the hot air intake by means of the air conditioning unit to the lowest temperature requirement of the various climate zones and, in order to be able to provide air for climate zones with higher temperature requirements, to guide away a certain portion of the hot air upstream from the air conditioning unit and to mix it with the air cooled by the air conditioning unit in accordance with the respective temperature requirement. With such a system, known also as the "Trim Air System", the required temperature in the individual climate zones of an aircraft cabin can be adjusted individually. If the aircraft cabin to be air-conditioned is very large, such systems are provided in multiples, e.g. double, i.e. two or more air conditioning units are provided, each comprising its own hot air supply and flow control.

There is a problem with the aforementioned systems in that in the event of a failure of all available air conditioning units the flow control throttles the volume of the hot air intake to the air conditioning units to zero in order to prevent the air conditioning unit from being damaged by the hot air. In such an event pressurization and temperature control of the aircraft cabin are no longer possible (it is to be noted in this context, that the term "aircraft cabin" as used herein includes the cockpit of an aircraft). In order to supply the aircraft occupants with the necessary fresh air in the event of a failure of all available air conditioning units it is known according to the state of the art to open a flap in the aircraft fuselage and to thereby allow ambient air to enter the aircraft. However at the normal flight altitudes of an aircraft and in cold regions even in a low-flying aircraft, the ambient temperature can be below −50° C. or even −60° C. with the result that the temperature in the aircraft cabin can fall to values below 18° C. due to the intake of cold outside air. Such low internal temperatures, however, are impermissible for either the passengers of an aircraft or its crew without additional protection.

Starting from the prior art system as described at the outset the object of the invention is to provide remedy and to propose a system that permits temperature control of the aircraft cabin even in the event of failure of all available air conditioning units.

SUMMARY OF THE DISCLOSED EMBODIMENTS

This object is achieved according to the invention with a device for heating an aircraft cabin, which device comprises the features defined in the patent claims. Accordingly, in addition to a first and a second hot air supply line already provided in the case of the state of the art, the device according to the invention is provided with a third hot air supply line upstream from the flow control valve, which third hot air line branches off the first hot air supply line and connects the latter to the second hot air supply line. Further, in the second hot air supply line a first close off mechanism is disposed upstream from the point at which the third hot air supply line opens into the second hot air supply line, which close off mechanism in its closed position prevents the flow of fluid through the second hot air supply line into the first hot air supply line. Finally a second close off mechanism is disposed in the third hot air supply line upstream from the position at which the third hot air supply line opens into the second hot air supply line. In the event of a failure of all available air conditioning units this design enables hot air to be directed to the aircraft cabin by bypassing the flow control valves and the air conditioning units. Since the available hot air is generally too hot to be guided immediately into the aircraft cabin, said hot air is mixed before its introduction into the aircraft cabin with cold ambient air fed in from outside the aircraft in the conventional manner in order to obtain a desired temperature. For this purpose the air temperature control means that is used in normal operation, i.e. when the air conditioning units are functioning, can be employed.

The device according to the invention is preferably embodied such that with the air conditioning unit operating normally the first close off mechanism assumes its open position and the second close off mechanism assumes its closed position. Hot air can then flow through the flow control valve disposed in the hot air supply line and subsequently partially to the air conditioning unit and partially bypassing the air conditioning unit into the aircraft cabin. This corresponds to the normal operating mode of the heating device according to the invention wherein the third hot air supply line is without function.

The device described above can be multiply provided, i.e. there can be a plurality of first hot air supply lines each leading to its respective air conditioning unit. In this case a flow control valve is disposed in each first hot air supply line and, as described, from each first hot air supply line a second and a third hot air supply line branch off wherein are disposed, as also described, a first close off mechanism in the second hot air supply line and a second close off mechanism in the third hot air supply line.

Should the air conditioning unit or all available air conditioning units fail the device according to the invention is preferably embodied such that the flow control valve (or all flow control valves) and the first close off mechanism (or all first close off mechanisms) assume/s its/their closed position and the second close off mechanism (or all second close off mechanisms) assume/s its/their open position. This prevents hot air from reaching and damaging the failed air conditioning units while still assuring a warm air supply to the aircraft cabin. In this way the aircraft cabin including the aircraft cockpit can continue to be heated and the necessary intake of fresh air can be maintained without further action.

In the case of preferred embodiments of the device according to the invention the/each first close off mechanism is a non-return valve. Non-return valves comprise a simple technical design and are reliable in operation. They further require no actuator for their operation and therefore save weight. In place of a non-return valve the first close off mechanism may however be formed by any device known to the person skilled in the art, which device in normal operation permits a flow of fluid from the first hot air supply line into and through the second hot air supply line and in the event of a failure of the associated air conditioning unit suppresses a flow of fluid through the second hot air supply line back into the first hot air supply line.

In the case of preferred embodiments the device according to the invention the/each second close off mechanism is formed by a stop valve, which stop valve is preferably automatically actuated. However, any device may be used as a second close off mechanism, which device in normal operation suppresses a flow of fluid out of the first hot air supply line into and through the third hot air supply line and permits this flow of fluid in the event of a failure of the air conditioning unit.

Each stop valve is preferably connected to a control means, particularly to the control means of the associated air conditioning unit, in order to open the flow path through the third hot air supply line in the event of a failure of the air conditioning unit. Alternatively the/each stop valve may also be set to a position by means of a switch in the aircraft cockpit in which position the third hot air supply line is opened.

The object cited at the outset is also achieved by a process for heating an aircraft cabin wherein a portion of a controlled flow of hot air from a hot air source is guided through an air conditioning unit and a portion is guided past the air conditioning unit into the aircraft cabin, wherein according to the invention in the event of a failure of the air conditioning unit the hot air is mixed with cold ambient air and is fed to the aircraft cabin by bypassing the flow control valves and the air conditioning unit. The cold ambient air can be mixed with the hot air at any suitable point.

To be able in the event of a failure of the air conditioning unit or all available air conditioning units to nevertheless adjust the air fed to the aircraft cabin to a particular desired temperature, in a preferred embodiment of the process according to the invention the control means that is responsible for the cabin air temperature in normal operation is also employed, which control means in this case mixes the hot air and the cold ambient air from outside the aircraft in the necessary ratio to achieve the desired temperature.

BRIEF DESCRIPTION OF THE DRAWINGS

An embodiment of a device according to the invention which also exemplifies the process according to the invention will in the following be explained in more detail based on the two diagrammatic figures.

DETAILED DESCRIPTION OF THE DISCLOSED EMBODIMENTS

Figure 1:
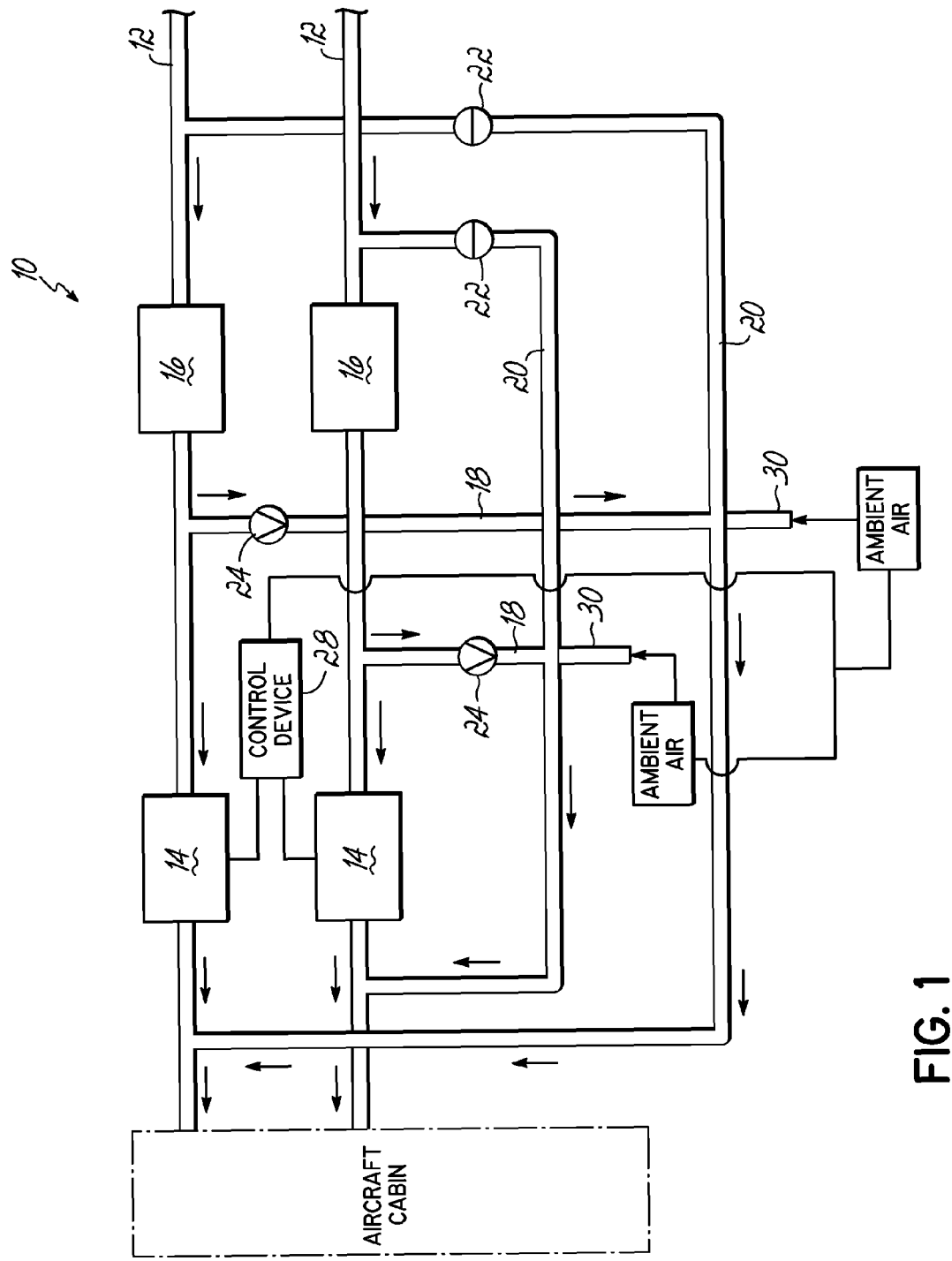
FIG. 1 shows the basic arrangement of the hot air supply lines and the various close off mechanisms with flow indicating arrows for normal operation.

FIG. 1 diagrammatically shows a section of a device 10 for heating an aircraft cabin. The illustrated device 10 concerns such a device for an aircraft whose aircraft cabin comprises a plurality of climate zones, i.e. the cabin temperature is not to be the same throughout the cab, but is to be differently adjustable depending on climate zone.

The device 10 comprises two first hot air supply lines 12 into which hot air is drawn in from one or a plurality of engines of the aircraft and/or from an auxiliary engine (auxiliary power unit). Hot air originating from the aircraft engines is frequently described as bleed air.

Each first hot air supply line 12 guides hot air to an air conditioning unit 14 that cools the intake air to the lowest temperature required for the climate zone of the aircraft cabin having the lowest temperature. In each first hot air supply line 12 is disposed a flow control valve 16 in order to be able to monitor and control the quantity of hot air flowing to the respective air conditioning unit 14.

The air required to supply the climate zone with the lowest temperature is guided from the air conditioning unit 14 directly into the aircraft cabin. For the remaining climate zones the air exiting the air conditioning unit 14 must be heated more or less intensely. For this purpose a second hot air supply line 18 branches off downstream from the flow control valve 16 but upstream from the air conditioning unit 14 from each first hot air supply line 12 via which second hot air supply line 18 hot air bypasses the air conditioning unit 14. This hot air is mixed in the required amount with the cooled air flowing out of the air conditioning unit 14 wherein a control means 28 (shown schematically in FIG. 1) responsible for the cabin air temperature achieves the required temperature by adjusting the ratio of the mixture of cooled air and hot air. This arrangement is also described as a "Trim Air System".

Figure 2:
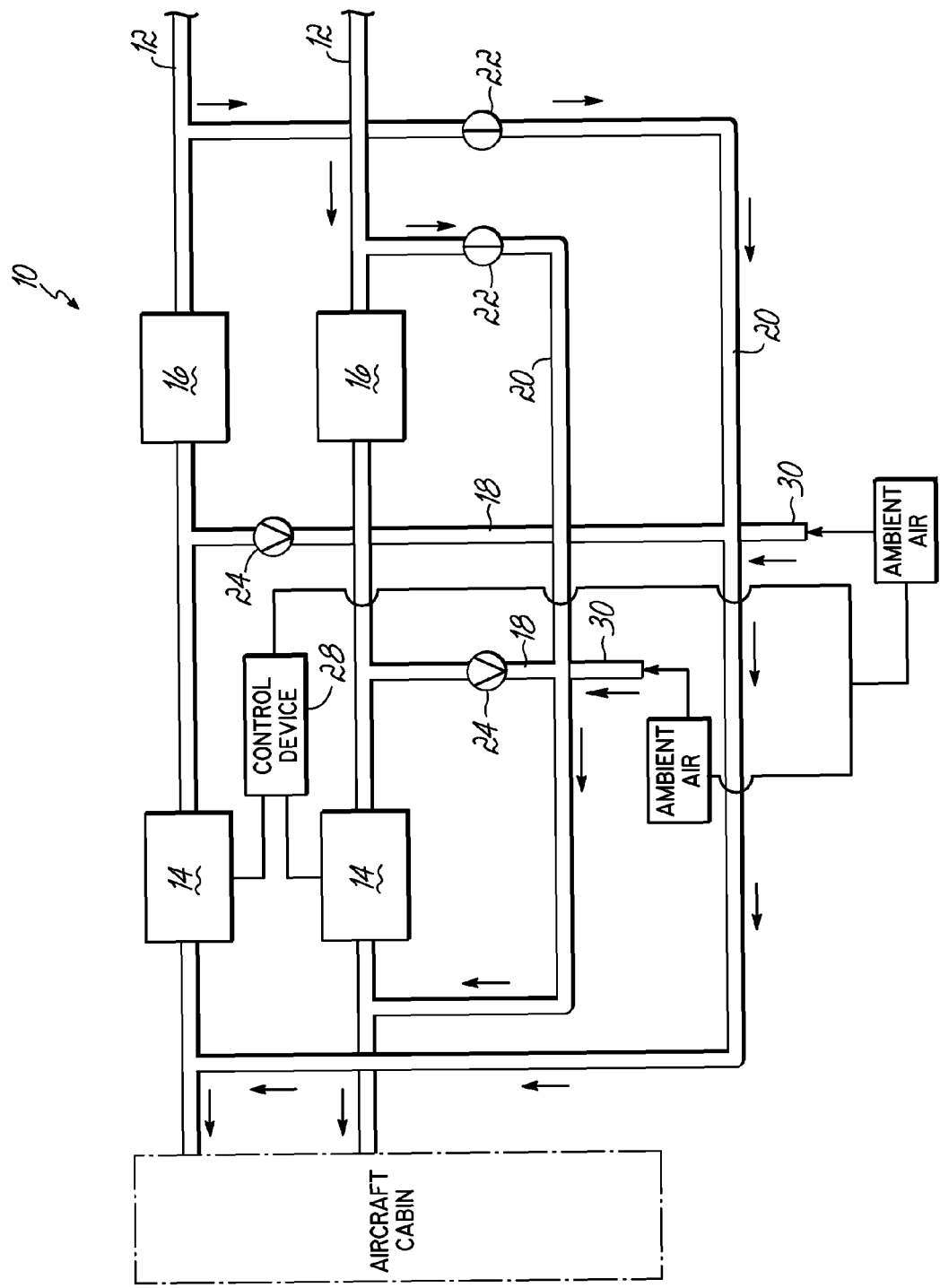
FIG. 2 shows the basic arrangement of the hot air supply lines and the various close off mechanisms with flow indicating arrows for operation with failure of the air conditioning units.

As illustrated in FIG. 2, in the case of a failure of the air conditioning unit 14 the flow control valves 16 are closed in order to prevent the hot air from destroying the air conditioning unit 14. In order also to be able to control the temperature in the aircraft cabin in such a case a third hot air supply line 20 branches off from each first hot air supply line 12 upstream from the flow control valve 16 which third hot air supply line 20 connects the first hot air supply line 12 to the second hot air supply line 18. In each third hot air supply line 20 is disposed an automatically actuated stop valve 22 which in normal operation, i.e. when the air conditioning unit 14 is functioning, assumes its closed position in order to prevent air flowing through the third hot air supply line 20.

In an emergency, i.e. in the event of failure of the air conditioning unit 14, the stop valve 22 is maneuvered to its open position by a switch located in the aircraft cockpit or actuated by a control means connected to the stop valve 22 such that hot air can bypass the flow control valve 16 and the air conditioning unit 14 and flow to the aircraft cabin. In order to prevent the hot air that flows through the third hot air supply line 20 from flowing through the second hot air supply line 18 back into the first hot air supply line 12 and from there to the air conditioning unit 14 and thereby damaging the air conditioning unit 14, a non-return valve 24 is respectively disposed in the second hot air supply line 18 upstream from the opening of the third hot air supply line 20.

The hot air flowing out of the third hot air supply line 20 into the second hot air supply line 18 and from there to the aircraft cabin is mixed before entering the aircraft cabin with cold ambient air that is fed to the device 10 via a conventional flap 30 (shown schematically in FIG. 2) such as is known to the person skilled in the art and is therefore not described further here. The control means 28 (shown schematically in FIG. 2) also used in normal operation is employed in this circumstance for setting a desired cabin temperature.

The invention claimed is:

1. Device (10) for heating an aircraft cabin, comprising:
a first hot air supply line (12) leading to an air conditioning unit (14) for supplying hot air thereto;
a flow control valve (16) that throttles the volume of hot air to the air conditioning unit (14), the flow control valve (16) disposed in the first hot air supply line (12) upstream from the air conditioning unit (14);
a second hot air supply line (18) branching off from the first hot air supply line (12) between the flow control valve (16) and the air conditioning unit (14), bypassing the air conditioning unit (14) and connecting to a downstream end of the air conditioning unit (14) so as to enable mixing of the hot air supplied via the second hot air supply line (18) with cool air flowing out of the air conditioning unit (14) prior to delivery of the air to the aircraft cabin;

a control device (28) adapted to adjust the mixing of the hot air supplied via the second hot air supply line (18) and the cool air flowing out of the air conditioning unit (14) so as to achieve a controlled cabin air temperature, during a normal mode of operation;

a third hot air supply line (20) branching off from the first hot air supply line (12) upstream from the flow control valve (16) and connecting to the second hot air supply line (18) upstream of where the hot air supplied via the second hot air supply line (18) mixes with cool air flowing out of the air conditioning unit (14);

a first close off mechanism (24) disposed in the second hot air supply line (18) upstream from the junction with the third hot air supply line (20), the first close off mechanism (24) operable to, when in a closed position, prevent a flow from the third hot air supply line (20) and the second hot air supply line (18) back to the first hot air supply line (12);

a second close off mechanism (22) disposed in the third hot air supply line (20) upstream from the junction with the second hot air supply line (18) and operable to close off the third hot air supply line (20) during the normal mode of operation and to open the third hot air supply line (20) if the air conditioning unit (14) fails; and an ambient air inlet flap (30) connected to one of the second or third hot air supply lines (18, 20) upstream of the aircraft cabin and adapted to feed cold ambient air for mixing with the hot air supplied via the third hot air supply line (20), when the air conditioning unit (14) fails, wherein the control device (28) is also adapted to adjust the mixing of the hot air supplied via the third hot air supply line (20) and the cold ambient air supplied by the ambient air inlet flap (30) when the air conditioning unit (14) fails, so as to achieve the controlled air cabin temperature.

2. Device according to claim 1, wherein the first close off mechanism (24) assumes its open position and the second close off mechanism (22) assumes its closed position during a normal mode of operation.

3. Device according to claim 1, wherein the flow control valve (16) and the first close off mechanism (24) assume their closed positions and the second close off mechanism (22) assumes its open position during a failure of the air conditioning unit (14).

4. Device according to claim 1, further comprising a plurality of first hot air supply lines (12) leading to a plurality of respective air conditioning units (14);

a flow control valve (16) in each first hot air supply line (12);

a plurality of second hot air supply lines (18), each second hot air supply line (18) branching off from the respective first hot air supply line (12) between the respective flow control valve (16) and the air conditioning unit (14) to bypass the associated air conditioning unit (14), so as to enable mixing of hot air supplied via the respective second hot air supply line (18) with air cooled by the air conditioning unit 14;

a plurality of third hot air supply lines (20), each third hot air supply line (20) branching off the respective first hot air supply line (12) upstream of the respective flow control valve (16) and coupled to the associated second hot air supply line (18) upstream of where the hot air supplied via the second hot air supply line (18) mixes with air cooled by the air conditioning unit (14);

a plurality of first close off mechanisms (24), each first close off mechanism (24) in a respective second hot air supply line (18) upstream from the junction with the associated third hot air supply line (20); and a plurality of second close off mechanisms (22), each second close off mechanism (22) in a respective third hot air supply line (20) upstream from the junction with the associated second hot air supply line (18).

5. Device according to claim 1, wherein the first close off mechanism is a non-return valve (24).

6. Device according to claim 1, wherein the second close off mechanism is a stop valve (22).

7. Device according to claim 6, wherein the stop valve (22) is automatically actuated.

8. Device according to claim 7, wherein the stop valve (22) is connected to the control device (28).

9. Method for heating an aircraft cabin, comprising:

guiding a controlled flow of hot air from a hot air source via a first hot air supply line (12) and then through an air conditioning unit (14);

throttling the volume of hot air to the air conditioning unit (14) using a flow control valve (16);

directing a portion of the controlled flow of hot air from the hot air source via a second hot air supply line (18), the second hot air supply line (18) branching from the first hot air supply line (12) downstream of the flow control valve (16) but upstream from the air conditioning unit (14), the portion being directed to bypass the air conditioning unit (14) and mix with cool air flowing out of a downstream end of the air conditioning unit (14) during a normal mode of operation;

adjusting, via a control device (28), the mixing of the hot air supplied via the second hot air supply line (18) and the cool air flowing out of the air conditioning unit (14), thereby to achieve the required cabin air temperature during a normal mode of operation;

supplying hot air via a third hot air supply line (20) that branches off the first hot air supply line (12) upstream of the flow control valve (16) and connects to the second hot air supply line (18) upstream of where the hot air supplied via the second hot air supply line (18) mixes with cool air flowing out of the air conditioning unit (14), thereby to bypass the air conditioning unit (14) and the flow control valve (16) in the event of a failure of the air conditioning unit (14);

supplying cold ambient air via an ambient air inlet flap (30) connected to one of the second or third hot air supply lines (18, 20) upstream of the aircraft cabin in the event of a failure of the air conditioning unit (14); and adjusting, via the control device (28), the mixing of the hot air supplied via the third hot air supply line (20) with the cold ambient air supplied via the ambient air inlet flap (30), thereby to achieve the required cabin air temperature when the air conditioning unit (14) fails.

* * * * *